United States Patent [19]

Lichtblau

[11] 4,168,496
[45] Sep. 18, 1979

[54] QUASI-STATIONARY NOISE CANCELLATION SYSTEM

[76] Inventor: George J. Lichtblau, 13 Tannery Hill Rd., Ridgefield, Conn. 06810

[21] Appl. No.: 839,662

[22] Filed: Oct. 5, 1977

[51] Int. Cl.² .................. G08B 13/24; G08B 13/29
[52] U.S. Cl. ................................. 340/572; 393/5 PD
[58] Field of Search ............... 340/280, 258 C, 572; 343/6.8 R, 5 PD; 358/108; 325/475

[56] References Cited

U.S. PATENT DOCUMENTS

| 3,743,768 | 7/1973 | Copland | 358/108 |
| 3,863,244 | 1/1975 | Lichtblau | 340/280 |
| 3,885,234 | 5/1975 | Fujimoto | 343/5 PD |
| 3,988,533 | 10/1976 | Mick et al. | 358/108 |
| 4,016,529 | 4/1977 | Inuzuka et al. | 343/5 PD |
| 4,025,718 | 5/1977 | Paretti | 358/108 |

OTHER PUBLICATIONS

Kosuke Matsunaga, "Multi Video Sensor,", Soc. of Photo-Opt. Inst. Engrs. Seminar on Solving Probs. in Security..., NY (20-21 Sep. 1972).

Primary Examiner—Glen R. Swann, III
Attorney, Agent, or Firm—Weingarten, Maxham & Schurgin

[57] ABSTRACT

An electronic security system detects a resonant tag circuit even in the presence of a substantially identical spurious resonance. The spurious resonance is fixed or quasi-stationary in time, in relation to the time that a resonant tag circuit is present in a security system. A representation of the quasi-stationary noise is stored in an electronic memory and is subtracted from a received signal to automatically cancel the interfering noise.

16 Claims, 9 Drawing Figures

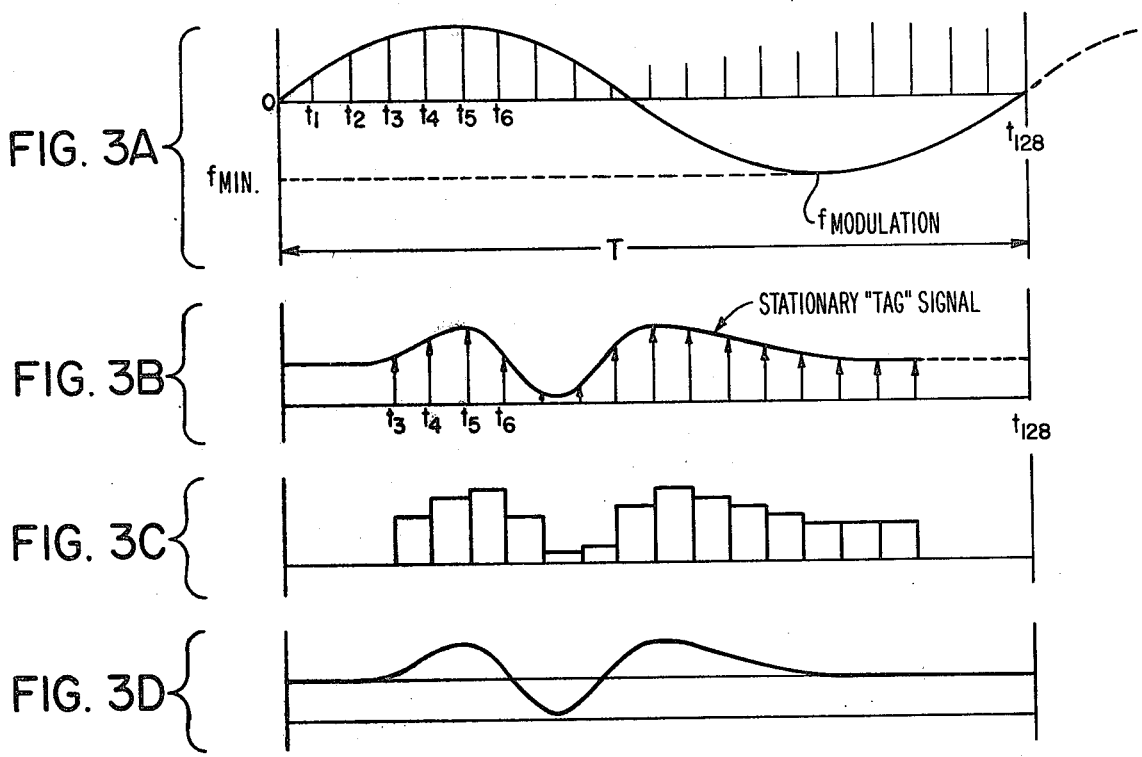
FIG. 3A
FIG. 3B
FIG. 3C
FIG. 3D
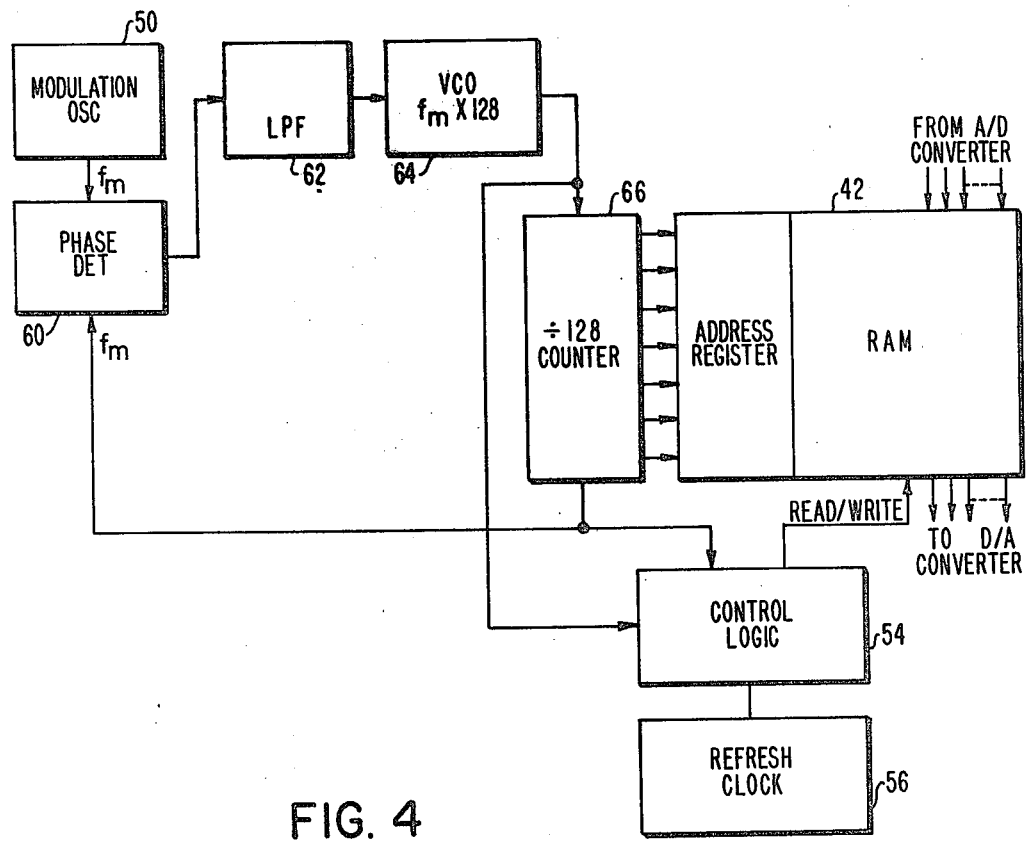
FIG. 4

QUASI-STATIONARY NOISE CANCELLATION SYSTEM

FIELD OF THE INVENTION

This invention relates to electronic security systems and more particularly to circuitry for such systems to reject noise caused by quasi-stationary resonant noise sources.

BACKGROUND OF THE INVENTION

An electronic security system is described in U.S. Pat. Nos. 3,810,147 and 3,863,244 for detection of the unauthorized removal of items containing a resonant tag circuit. Such system employs a transmitter providing a repetitively swept range of frequencies driving an antenna which generates a swept electromagnetic field in a zone under surveillance. A resonant tag includes a circuit resonant at a frequency within the swept band and operative in response to the applied field to resonate at its characteristic frequency which is sensed by the receiver portion of the system and processed to provide an output alarm indication of tag presence in the surveillance zone. The receiver includes signal discrimination circuits for distinguishing between an actual tag and spurious signals which could be falsely detected as a tag and therefore cause a false alarm. Preferred signal processing techniques for such electronic security systems are shown in the above-cited patents.

In an electronic security system such as that described in the aforesaid patents, any resonant circuit of a frequency within the swept band and of appropriate quality factor (Q) in close proximity to the system will actuate the alarm, since such resonant circuit is not distinguishable from and will be falsely detected as a resonant tag. In use of an electronic security system installed in a retail store, a library or other facility, the surrounding electrical environment can itself be a resonant circuit. In a particular installation, power cables, lights, copying machines and the like, can be self-resonant in the same frequency range as the swept range of the security system, and if the spurious resonance is of high Q, the system will detect this resonance and provide a false alarm. If the spurious resonance is of low Q, the sensitivity of the security system in the frequency range of this resonance will be decreased since the low Q signal will tend to distort the shape of the actual tag signal that the system is designed to detect.

SUMMARY OF THE INVENTION

In accordance with the present invention, an electronic security system is operative to discriminate against spurious signals having the same resonance characteristics as an actual resonant tag signal and to detect a resonant tag circuit even in the presence of a substantially identical spurious resonance. The spurious resonance is fixed or quasi-stationary in time in that it changes very slowly with time or not at all, since this spurious resonance is due to fixed or slowly varying physical conditions in a particular electronic security system installation. Typically, the characteristics of the spurious resonance may gradually change over a period of one hour or more, while the actual tag is present for sensing by the security system for no more than a few seconds.

The invention includes an electronic memory for storing a representation of the quasi-stationary noise signal which is continuously present as part of a signal received by the electronic security system. The stored representation is subtracted from the received signal to cancel the quasi-stationary signal component and to pass unimpeded the signal caused by an actual tag when present in the security system. The memory is periodically updated to account for relatively slow variations in the characteristics of the quasi-stationary noise. So long as the quasi-stationary noise remains substantially constant between the memory update times, such interfering noise is automatically cancelled and provides no affect on the alarm performance of the security system.

DESCRIPTION OF THE DRAWINGS

The invention will be more fully understood from the following detailed description taken in conjunction with the accompanying drawings, in which:

FIGS. 3A–3D are waveforms useful in illustrating operation of the system of FIG. 2;

FIG. 4 is a block diagram of the phase synchronizing logic of the embodiment of FIG. 2;

DETAILED DESCRIPTION OF THE INVENTION

Figure 1:
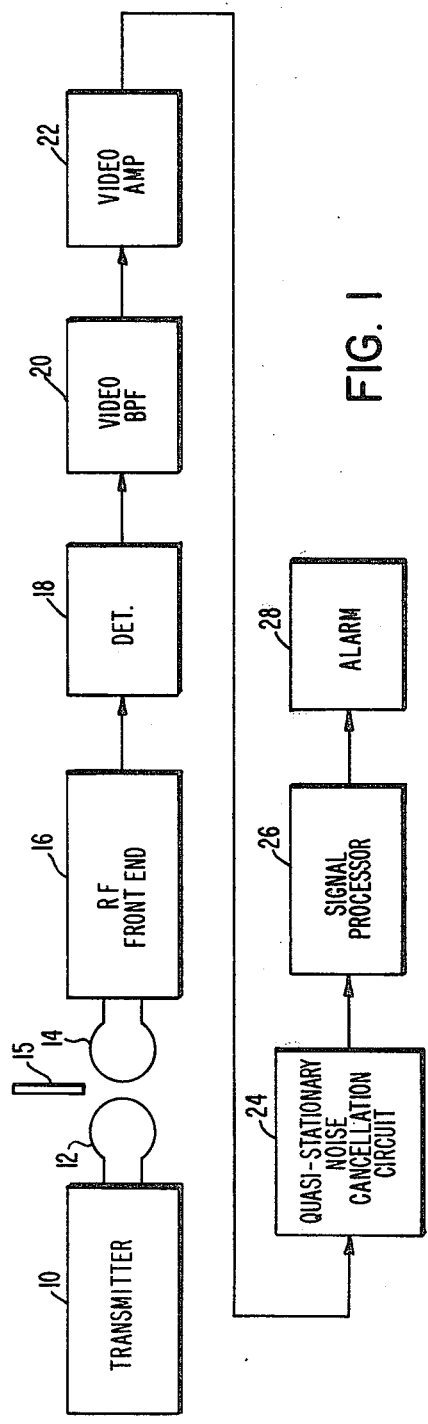
FIG. 1 is a block diagram of an electronic security system employing the invention.

An electronic security system is shown in FIG. 1 and includes a transmitter 10 coupled to an antenna 12 operative to provide an electromagnetic field within a predetermined area to be controlled and which is repetitively swept over an intended frequency range. A receiving antenna 14 at the controlled area receives energy electromagnetically coupled from antenna 12 and is coupled to an RF front end 16 which includes an RF bandpass filter and RF amplifier. The output of the front end 16 is applied to a detector 18, the output of which is coupled to a video bandpass filter 20 which is effective to pass only an intended frequency band and to remove carrier frequency components and high frequency noise. The output of filter 20 is applied to a video amplifier 22 and thence to quasi-stationary noise cancellation circuit 24. The output signal from circuit 24 is applied to signal processor 26, the output signal of which is applied to an alarm 28 or other output utilization apparatus to denote detection of a resonant tag 15 in the controlled area. The system illustrated in FIG. 1, except for the quasi-stationary noise cancellation circuit 24, is the subject of the above-identified patents and is operative to detect tag presence in a controlled area and to provide an alarm indication thereof. The signal processor 26 includes noise rejection circuitry operative to discriminate between actual tag signals and spurious signals which could be falsely detected as a tag and therefore cause a false alarm, as described in the aforesaid patents. In accordance with this invention, fixed or quasi-stationary noise is cancelled by circuit 24 which is of a character to not be distinguishable by signal processor 26 from a real tag signal.

Figure 2:
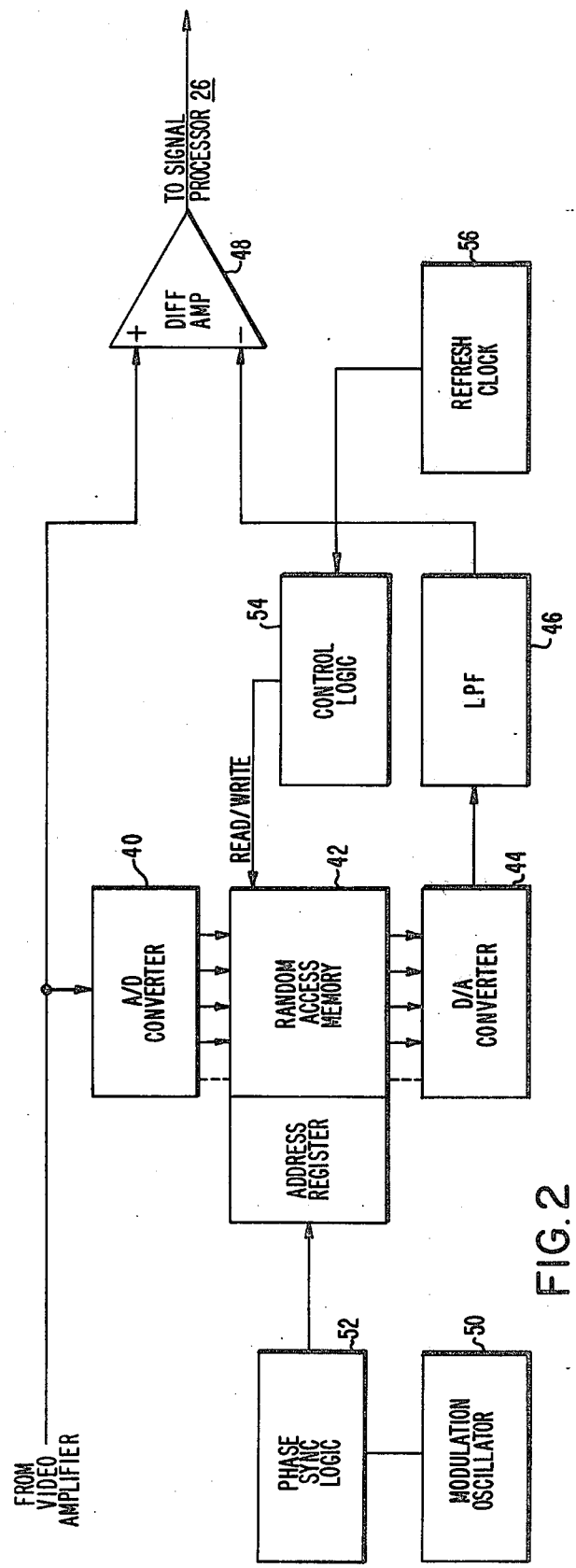
FIG. 2 is a block diagram of a digital circuit implementation of the noise cancellation circuit of the invention.

A digital circuit implementation of the invention is shown in FIG. 2 and employs a digital random access memory (RAM) to store a representation of the quasi-stationary interfering signal to be cancelled. The digital implementation is especially suitable by reason of the small and relatively low cost semiconductor digital circuits presently available. The signals from video amplifier 22 are applied to an analog-to-digital (A/D) converter 40, the digital output signals of which are applied to random access memory 42. The digital output signals from memory 42 are applied to a digital-to-analog (D/A) converter 44, the analog output signal of which is applied via a lowpass filter 46 to the negative input of a differential amplifier 48. The received signal from video amplifier 22 is also applied to the positive input of differential amplifier 48. An oscillator 50 which is part of transmitter 10 (FIG. 1) drives phase synchronization logic 52, the output signals of which are applied to the address register of memory 42. A read/write control signal from control logic 54 is also applied to memory 42. A refresh clock 56 is also coupled to logic 54 to provide a gating signal thereto.

The memory 42 stores one complete picture or frame of the signals received from video amplifier 22, the picture or frame being defined by one complete cycle of the swept frequency signal of transmitter 10 (FIG. 1). Only a single picture or frame is stored in the memory during any particular operating interval. The refresh clock 56 provides a gating signal to control logic 54 to cause entry of new data into the memory representing a new picture of the quasi-stationary noise.

The interfering signal, which is a component of the received signal from video amplifier 22, remains fixed in time or changes very slowly with time such that the signal is continuously present during operation of the electronic security system. A representation of this interfering signal is stored in memory 42 and a signal derived from this stored version is subtracted from the received signal by differential amplifier 48 to thereby cancel the quasi-stationary noise. The differential amplifier output signal, in the absence of an actual resonant tag to be detected, is substantially zero except for residual noise caused for example by the electronic circuitry itself. In the presence of an actual tag circuit, which gives rise to a tag signal present in the received signal from video amplifier 22, the tag signal is provided at the output of differential amplifier 48.

In the presence of a real or actual resonant tag signal, this intended signal is added to the interfering signal present at the output of video amplifier 22 but this signal is not added to the signal stored by memory 42, since the memory contains only a stored version of the interfering signal which has been gated therein prior to receipt of an actual tag signal. The resultant signal provided by differential amplifier 48 includes only the actual tag signal plus any residual noise present in the system. During typical operation of an electronic security system, a real tag signal is present usually for less than a few seconds. The memory is typically updated every ten to sixty minutes; therefore, there is very low probability that the real tag signal will be loaded into the memory and itself be cancelled out. Of course, the memory can be updated by manual control at a time when an operator can assure the absence of an actual tag.

The modulation oscillator 50 provides a sinusoidal signal depicted in FIG. 3A, each cycle of this signal being divided into a plurality of sub-periods labeled $t_1$ through $t_{128}$ which are phase synchronized with the modulation signal. The quasi-stationary interfering signal is depicted in FIG. 3B, which also illustrates the digitized samples of this interfering signal provided by analog-to-digital converter 40, and which are stored in memory 42. The address of the quantity read into the memory at any time $t_n$ must be phase synchronized with the time that the sample of the input waveform was taken such that the amplitude of the signal sample at time $t_n$ can be read out of memory once each modulation cycle at exactly the $t_n$ time slot. Thus, the signal stored in the digital memory can be read out of memory in precise phase synchronization with the original input signal. The output signals read out of memory 42 are depicted in FIG. 3C, these discrete samples being smoothed by lowpass filter 46 to reconstruct the analog representation of the interfering signal, as shown in FIG. 3D. The analog output signal from lowpass filter 46 is subtracted from the signal from video amplifier 22 by differential amplifier 48 to provide cancellation of the quasi-stationary interfering signal, while the real tag signal is passed by differential amplifier 48 unimpeded.

The phase synchronizing logic 52 is shown in greater detail in FIG. 4. A phase detector 60 receives the signal $f_m$ from the transmitter oscillator 50 and provides an output signal to a lowpass filter 62 which, in turn, provides a signal to voltage controlled oscillator (VCO) 64 which operates at 128 times the frequency $f_m$ of the transmitter oscillator. The voltage controlled oscillator provides a signal to a ripple counter 66, such as a 7 stage binary ripple counter, which serves as a divide-by-128 digital counter providing a multiple bit digital output signal to the memory 42. A serial square wave output of counter 66 is also applied as a reference signal to phase detector 60. The output from counter 66 and the output from voltage controlled oscillator 64 are also applied to control logic 54 which provides read/write control signals to the memory. It will be appreciated that the phase detector 60, filter 62, voltage controlled oscillator 64 and counter 66 function as a frequency synthesizer with a phase lock loop, in which the voltage controlled oscillator is caused to oscillate at exactly 128 times the rate of the transmitter oscillator and in exact phase synchronization therewith. The counter 66 serves as part of the phase lock loop and also as the address counter for the memory. It will be recognized that 128 samples are described as an illustration and that the invention is not limited to any specific sampling rate.

The counter 66 runs continuously and the data stored in memory is read continuously into digital-to-analog converter 44. The converted signal after smoothing by lowpass filter 46 is applied to the differential amplifier wherein the stored representation of the interfering signal is subtracted from the then received signal from the video amplifier for cancellation of quasi-stationary noise, as previously described. Periodically, typically once every ten minutes, the refresh clock 56 provides a gating signal to control logic 54 which conveys a write command to the memory 42 to permit a new set of samples to be loaded into the memory from the A/D converter 40. The new data stored in the memory is an updated version of the quasi-stationary interfering signal which, in the manner described above, is cancelled prior to subsequent processing of a received signal for alarm detection.

Figure 5:
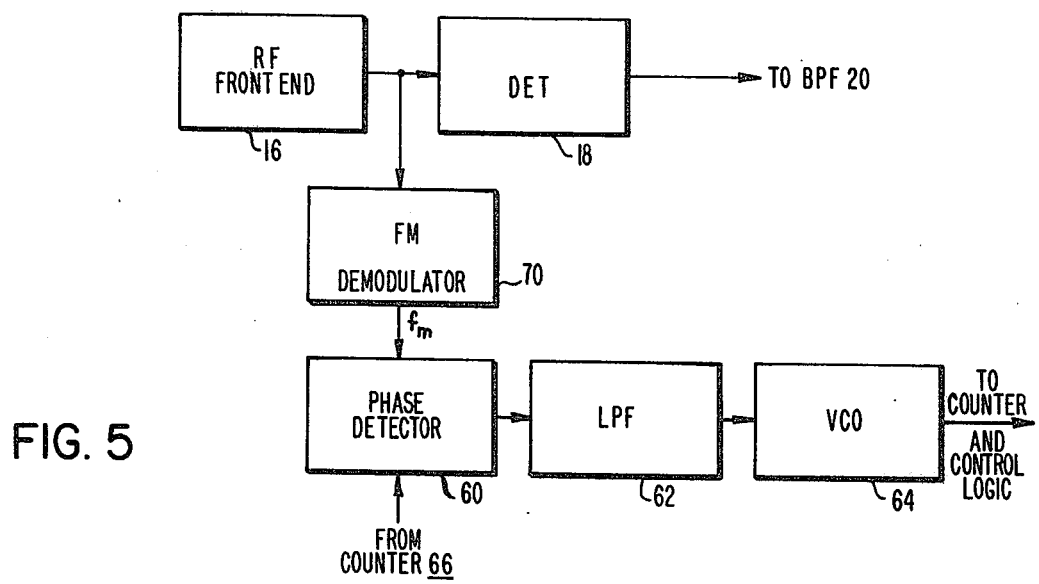
FIG. 5 is a block diagram of an alternative embodiment of the invention requiring no direct connection between the transmitter and receiver of the security system.

An alternative embodiment is shown in FIG. 5 in which there is no direct connection between the transmitter and the receiver, as in the embodiment of FIG. 2, wherein such a direct connection is employed to provide a signal to the phase detector from the transmitter oscillator. Referring to FIG. 5, the output signal from the RF front end 16 of the receiver is, as described above, applied to a detector 18 which provides a demodulated signal for subsequent processing and alarm actuation in the presence of a resonant tag circuit in the controlled area. The output of the RF front end is also applied to an FM demodulator 70 which provides an output signal $f_m$ which is a replica of the modulation signal provided by the transmitter oscillator. Preferably, the FM demodulator is a phase lock loop demodulator. This output signal from the demodulator 70 is then applied to the phase detector 60 of the phase synchronizing logic (FIG. 4).

Figure 6:
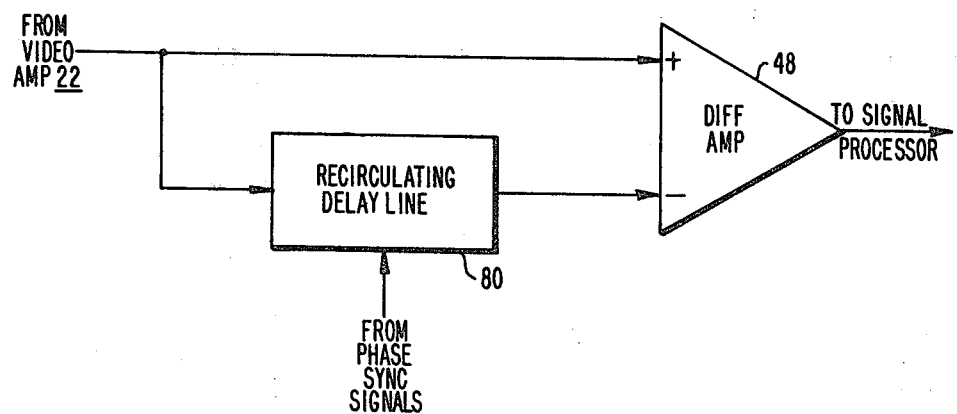
FIG. 6 is a block diagram of an analog circuit implementation of the noise cancellation circuit of the invention.

An analog circuit implementation of noise cancellation circuit 24 is illustrated in FIG. 6. The signals from video amplifier 22 are applied to a recirculating delay line 80, the output of which is applied to the negative input of differential amplifier 48. The received signals from the video amplifier are also applied to the positive input of the differential amplifier. The recirculating delay line 80 serves as the memory for storage of one picture or frame of the received signal defined by one complete sweep frequency cycle of transmitter 10. In an analog implementation, the gain of the output signal from the recirculating delay line must be adjusted to compensate for the loss in gain due to attenuation by the delay line, and appropriate automatic gain control can be provided to maintain the gain of the delay line output signal such that the signal is at a proper amplitude level for cancellation by the differential amplifier. The delay line 80 can be of a type, such as an acoustic delay line, providing the precise delay for storing one cycle of the received quasi-stationary noise signal, in which event no synchronizing circuit is needed. If the delay line 80 is of an active type, such as a charge coupled device delay line, not inherently providing an intended delay time, phase synchronizing signals must be provided as in the manner described above.

It will be appreciated that the invention is not to be limited by what has been particularly shown and described as various modifications and alternative implementations will now occur to those versed in the art. Accordingly, the invention is to be limited only as set forth in the accompanying claims.

What is claimed is:

1. An electronic security system comprising:
    transmitter means for providing an electromagnetic field in a predetermined area at a frequency respectively swept through a predetermined range of frequencies;
    a resonant tag circuit having at least one resonant frequency within said predetermined range of frequencies;
    receiver means for detecting the presence of said at least one resonant frequency from a tag circuit present in the predetermined area;
    signal processor means for providing an output indication of alarm actuation in response to a signal from said receiver means; and
    noise cancellation means operative to discriminate against spurious signals in said receiver signal arising from a source having the same resonance characteristics as said tag circuit and which are quasi-stationary in time, and provide an output signal to said signal processor means free of said noise.

2. The system of claim 1 wherein said noise cancellation means includes:
    means operative to store a representation of said quasi-stationary signals; and
    means operative to subtract said stored representation from a signal from said receiver means to cancel said quasi-stationary signals.

3. The system of claim 2 wherein said storage means includes:
    a recirculating delay line containing a stored representation of said quasi-stationary signals.

4. The system of claim 2 wherein said storage means includes:
    digital memory means containing data representative of said stored quasi-stationary signals.

5. For use in an electronic security system having a transmitter producing a repetitively swept frequency band, a resonant tag of resonant frequency within the swept band, receiver means to detect any resonant frequency of the tag produced by the swept field and to provide a signal indication thereof and signal processor means for providing an alarm indication in response to the signal from the receiver means, a noise cancellation circuit operative to discriminate against spurious signals in the receiver signal arising from a source having the same resonance characteristics as the tag and which are quasi-stationary in time, comprising:
    means operative in response to a signal from said receiver means to store a representation of quasi-stationary noise; and
    means operative to combine said stored representation with the signal from said receiver means to substantially cancel said quasi-stationary noise, and provide a signal to said signal process means free of said noise.

6. The circuit of claim 5 wherein said storage means includes:
    means for converting the signal from said receiver means into a digital representation thereof;
    a digital memory operative in response to said digital representation to store data representing said quasi-stationary noise; and
    means for converting the digital output of said memory means into an analog signal for application to said combining means.

7. The circuit of claim 5 wherein said storage means is operative to store a representation of one cycle of the swept frequency of said transmitter.

8. The circuit of claim 7 including means for periodically gating said storage device to cause storage of an updated representation of said quasi-stationary noise.

9. The circuit of claim 8 including means for synchronizing said storage means such that the representation of quasi-stationary noise stored therein can be read out in phase synchronization with the signal from said receiver means.

10. For use in an electronic security system having a transmitter producing a repetitively swept frequency band, a resonant tag of resonant frequency within the swept band, receiver means to detect any resonant frequency of the tag produced by the swept field and to provide a signal indication thereof and signal processor means for providing an alarm indication in response to the signal from the receiver means, a noise cancellation circuit operative to discriminate against spurious signals in the receiver signal arising from a source having the same resonance characteristics as the tag and which are quasi-stationary in time, comprising:

analog-to-digital converter means operative in response to the signal from said receiver means to provide a digital signal representation of quasi-stationary noise;

digital memory means for storing data in accordance with said digital signal representation;

digital-to-analog converter means operative in response to stored data in said memory means to provide an analog signal representation thereof;

means for synchronizing the data entered into said memory means with the received signal from said transmitter; and means operative in response to the signal from said receiver means and the analog signal from said digital-to-analog converter means to cancel said quasi-stationary noise and provide an output signal to said signal processor means free of said noise.

11. The circuit of claim 10 wherein said synchronization means includes:

a phase lock loop including a binary counter operative as the address counter for said memory means to provide address data phase synchronized with the signal from said transmitter.

12. The circuit of claim 11 wherein said phase lock loop receives a reference signal from said transmitter.

13. The circuit of claim 11 wherein said synchronization means includes:

an FM demodulator operative in response to a signal from the RF front end of said receiver means and providing an output signal which is a replica of a modulation signal provided by the transmitter, said replica signal being employed as a reference for said phase lock loop.

14. The circuit of claim 10 wherein said last-named means includes:

differential amplifier means providing in the presence of an actual tag an output signal representing the actual tag, and providing in the absence of an actual tag an output signal which is substantially zero and which is free of said quasi-stationary noise.

15. The circuit of claim 10 wherein said memory means is operative to store data representing one cycle of the swept transmitter frequency.

16. The circuit of claim 15 wherein said memory means includes control means operative to read out stored data in said memory means in phase synchronization with the signal from said receiver means.

* * * * *

UNITED STATES PATENT AND TRADEMARK OFFICE
CERTIFICATE OF CORRECTION

PATENT NO. : 4,168,496
DATED : September 18, 1979
INVENTOR(S) : George Jay Lichtblau It is certified that error appears in the above–identified patent and that said Letters Patent are hereby corrected as shown below:

Column 5, lines 51-52, "respectively" should read --repetitively--.

Signed and Sealed this

First Day of April 1980

[SEAL]

Attest:

SIDNEY A. DIAMOND

Attesting Officer     Commissioner of Patents and Trademarks